US005751618A

United States Patent [19]
Abiko et al.

[11] Patent Number: 5,751,618
[45] Date of Patent: May 12, 1998

[54] ARITHMETIC CIRCUIT

[75] Inventors: Shigeshi Abiko, Tokyo; Shintaro Mizushima, Chiba-ken, both of Japan; Marc Couvrat, Saint Laurent du Var, France

[73] Assignee: Texas Instruments Incorporated, Dallas, Tex.

[21] Appl. No.: 391,871

[22] Filed: Feb. 22, 1995

[51] Int. Cl.$^6$ ............................................... G06F 7/38
[52] U.S. Cl. ............................................... 364/736.01
[58] Field of Search ............................ 364/736, 760, 364/715.01, 769, 734; 307/201

[56] References Cited

U.S. PATENT DOCUMENTS

| 4,813,008 | 3/1989 | Shigehara et al. | 364/760 |
| 5,166,539 | 11/1992 | Uchimura et al. | 307/201 |

Primary Examiner—Reba I. Elmore
Assistant Examiner—Monica Lewis
Attorney, Agent, or Firm—Richard L. Donaldson; William B. Kempler

[57] ABSTRACT

An arithmetic circuit is provided in which the circuit scale can be reduced and the circuit delay can be shortened. The upper 24 bits and lower 16 bits of the 40 bit data A and B, that is input into the arithmetic circuit 100, are calculated in the first arithmetic circuit 110 and the second arithmetic circuit 120, respectively. The carry transmission control circuit 130 transmits the carry between the arithmetic circuit 120 and the arithmetic circuit 110 when the arithmetic circuit dividing signal p does not divide the arithmetic circuit, and the command control circuit 140 outputs an identical command to each of the arithmetic circuits. As a result, this circuit becomes an arithmetic circuit of 40 bits. The carry transmission control circuit 130 stops the transmission of the carry between the arithmetic circuit 120 and the arithmetic circuit 110 when the signal p divides the arithmetic circuit, and the command control circuit 140 outputs each of the independent commands to each of the arithmetic circuits. As a result, this circuit becomes a parallel arithmetic circuit of 24 bits and 16 bits.

6 Claims, 5 Drawing Sheets

5,751,618

ARITHMETIC CIRCUIT

BACKGROUND OF THE INVENTION

This invention pertains to an arithmetic circuit used in digital signal processors (referred to as DSPs below).

Demands for DSPs, which process digital signals with high accuracy and at high speeds, have dramatically increased with the accompaniment of digitization of various types of information and communication devices. Performance and features in general purpose DSPs have rapidly advanced through improvements in the architecture; these include improvements in drive frequencies, expansion in the bit length for processing data, contrivance of the addressing method, parallel processing, and pipeline processing, for example.

On the other hand, DSPs equipped with a special purpose processor have been developed and used when high-speed processes that exceed the performance of the general purpose DSP, such as real-time processing of moving pictures, were necessary. Much movement has also been observed in fields that use standardized algorithms or in fields in which the necessary processing features are set, to develop good performing special purpose DSPs in which excessive features have been eliminated, resulting in low power consumption.

As described above, DSPs properly equipped with both generality and special features, that are effectively equipped with various features, have been widely sought after.
0003

A central arithmetic circuit, a product sum/product difference arithmetic circuit, and an absolute value distance arithmetic circuit, which are commonly used in said conventional DSPs, will be explained with reference to FIGS. 8–12.

The central arithmetic circuit will be explained first.

FIG. 8 is a block diagram that explains a major structural area of a common central arithmetic circuit in the conventional DSP.

A central arithmetic circuit 500 is comprised of a multiplier 610, an arithmetic logic unit 520, and an accumulator 530, as the major structural area. Multiplier X and multiplicand Y, which are input via a data bus and a register, not shown in the figure, are multiplied in the multiplier 610, and the result is stored in a register 640. A multiplexer 550 selects one piece of data from the data resulting from the aforementioned multiplication, data in a register in the accumulator 530, or data Z, in another register that is not shown in the figure, for example. An arithmetic operation of the selected data and one piece of data that is stored in the accumulator 530 is performed in the arithmetic logic unit 520, and the result of the operation is again stored in the accumulator 530.

Each operation in the aforementioned multiplier 610 and the arithmetic logic unit 520 is performed in parallel, based on control signals that are not shown in the figure.

Next, the product sum/product difference arithmetic circuit will be explained.

FIG. 9 is a diagram indicating the structure of a conventional arithmetic circuit in which product sum/product difference operations are performed at high speeds. A multiplier 610, register 640, adder-subtractor 620, and register 630 are interconnected to construct the product sum/product difference arithmetic circuit 600 as shown in the figure. The multiplier and register at the aforementioned central arithmetic circuit 500 are generally used as the multiplier 610 and the register 640. The arithmetic logic unit 520, at the central arithmetic circuit 500, and a specific register in the accumulator 530 are used as the adder-subtractor 620 and the register 630 in some cases, or they may be constructed of a special separate circuit for the product sum/product difference operation.

The operation of the product sum/product difference arithmetic circuit 600 indicated in FIG. 9 will be explained below.

First, multiplier X and multiplicand Y, which are input via the data bus and register, not shown in the figure, are input in the multiplier 610, and a multiplication operation is performed.

The detailed structure of the multiplier 610 will be explained.

The multiplier 610 is comprised of encoders 611–614, partial product preparation units 615–618, and an adder 619. The multiplier 610 indicated in FIG. 9 is used as a multiplier in which an 8-bit multiplier X and a multiplicand Y are multiplied as an example.

The multiplier 610 performs multiplication operations using the so-called Booth algorithm, in which the multiplier is multiplied twice, it is then divided into sections with three bits in each, while one bit overlaps in each from the subordinate bit, a partial product is obtained for each of the divided sections, and their partial products are added to obtain a multiplied result. The aforementioned partial products can easily be obtained by operating the multiplicand Y based on the aforementioned values of three bits in each, as indicated in Table I.

TABLE I

| $d_a$ | $d_b$ | $d_c$ | Partial products $V_{a-c}$ |
|---|---|---|---|
| 0 | 0 | 0 | 0 |
| 0 | 0 | 1 | Multiplicand Y |
| 0 | 1 | 0 | Multiplicand Y |
| 0 | 1 | 1 | Multiplicand Y is shifted one bit to the left |
| 1 | 0 | 0 | Complement of multiplicand Y is shifted one bit to the left |
| 1 | 0 | 1 | Complement of multiplicand Y |
| 1 | 1 | 0 | Complement of multiplicand Y |
| 1 | 1 | 1 | 0 |

The most significant bit and the least significant bit in three bits are $d_2$ and $d_0$ in Table I.

Accordingly, multiplier X is first divided into four sections with three bits in each by overlapping one bit at the multiplier 610, like (0, X(0), X(1)), (X(1), X(2), X(3)), (X(3), X(4), X(5)), and (X(5), X(6), X(7)). The divided signals in three bits are consecutively input into the encoders 611–614.

Selection signals $S_{2-0}$ of the partial products $V_{3-0}$ are prepared by signals from each of the sections for multiplier X in the encoders 611–614. A diagram showing a logic circuit of the encoder 611 is indicated in FIG. 10. Selection signals $S_{2-0}$, indicated in Table II, are prepared by the signal $d_{2-0}$ at each of the sections for the multiplicand Y, that is input, in a circuit indicated in FIG. 10. The selection signals $S_{2-0}$, that are prepared, are input into the partial product preparation units 615–618.

Partial products $V_{3-0}$ are obtained by operating the multiplicand Y, as indicated in Table III, at the partial product preparation units 615–618, according to the selection signals $S_{2-0}$ that are input. The partial products $V_{3-0}$ that are obtained are input into an adder 619.

TABLE II

| $d_a$ | $d_1$ | $d_a$ | $S_1$ | $S_1$ | $S_1$ |
|---|---|---|---|---|---|
| 0 | 0 | 0 | 0 | 0 | 0 |
| 0 | 0 | 1 | 0 | 0 | 1 |
| 0 | 1 | 0 | 0 | 0 | 1 |
| 0 | 1 | 1 | 0 | 1 | 0 |
| 1 | 0 | 0 | 1 | 1 | 0 |
| 1 | 0 | 1 | 1 | 0 | 1 |
| 1 | • | 0 | 1 | 0 | 1 |
| 1 | • | 1 | 1 | 0 | 0 |

TABLE III

| $S_A$ | $S_1$ | $S_c$ | Partial products $C_m$ |
|---|---|---|---|
| 0 | 0 | 0 | 0 |
| 0 | 0 | 1 | Multiplicand Y |
| 0 | 1 | 0 | Multiplicand Y is shifted one bit to the left |
| 0 | 1 | 1 | Not selected |
| 1 | 0 | 0 | 0 |
| 1 | 0 | 1 | Complement of multiplicand Y |
| 1 | 1 | 0 | Complement of multiplicand Y is shifted one bit to the left |
| 1 | 1 | 1 | Not selected |

The partial products $V_{3-0}$, that are input from each of the partial product preparation units 615–618, are added, while shifting two bits for each, and because of the lag in the bits at the adder 619, the multiplication result V is obtained.

As described above, the multiplication result V, calculated in the multiplier 610, is stored in the register 640.

Next, the accumulation result W, which has been stored in the register 630 up to this point, and the aforementioned multiplication result V, which is stored in the register 640, are added or subtracted based on the arithmetic command I at the adder-subtractor 620, and its arithmetic result W' is again stored in the register 630. The structure of this adder-subtractor 620 is indicated in FIG. 11. An addition operation is performed when the arithmetic command is I=0 and a subtraction operation is performed when I=1 in the adder-subtractor 620 in FIG. 11.

Next, the absolute value distance arithmetic circuit will be explained.

Calculations in the absolute value distance, in which a difference between two numerical values is accumulated, can also be attained at the aforementioned general purpose central arithmetic circuit 500. An operation may be performed in the aforementioned central arithmetic circuit, in which subtraction the two target numerical values is performed, absolute values are obtained based on the sign resulting from the calculation, and the absolute values are consecutively added. However, the entire aforementioned operation is performed in the arithmetic logic unit, thus, parallelization cannot be attained and it requires a cycle for each target processing group; therefore, an effective process cannot be attained. Accordingly, DSPs equipped with a special purpose absolute value distance arithmetic circuit for calculating absolute values and absolute value distances have become available.

FIG. 12 is a diagram indicating the structure of said absolute value distance arithmetic circuit.

The absolute value distance arithmetic circuit 700 is equipped with an arithmetic circuit that is comprised of a subtractor 710, a positive and negative adjusting circuit 720, and an adder 730. With respect to two numerical values X and Y that are input from the data bus and register, not shown in the figure, numerical value Y is subtracted from numerical value X in the subtractor 710, and the result is stored in the register 740. The sign for the data stored in the register 740, which is the result of the aforementioned subtraction, is checked in the positive and negative adjusting circuit 720. The data is directly stored in the register 750 when it is positive. When the aforementioned data is negative, a complement of the data is obtained in order to reverse the positive and negative signs, and this data is stored in the register 750. Data stored in the register 750, and accumulated data that has been stored, up to that point, in the register 760, are added in the adder 730, and this is again stored in the register 760. The aforementioned operation is performed with all elementary numerical values at the end, and absolute value distances are stored in the register 760.

However, the central arithmetic circuit, product sum/product difference arithmetic circuit, and absolute value distance arithmetic circuit, which are widely used in the aforementioned conventional DSPs, have the various problems indicated below, and the problem of not being able to provide an effective general purpose and special purpose DSP.

First, there is the problem of not being able to effectively use the arithmetic and logic operation circuit in the central arithmetic circuit. Attempts have been made in recent years to increase the bit length of the processing data at the arithmetic circuit, in order to improve processing performance. However, in many cases, this increase in bit length did not correspond to improvements in performance in general processing. In other words, in processes that are performed using DSPS, many are sufficiently processed at a bit length of 8 bits or 16 bits, 32 bits at the most. The maximum value is often sufficient with the aforementioned small bit lengths at the initial stage during the accumulation process, for example. An increase in the bit length a processing word by the DSP to 40 bits and 64 bits, for example, did not contribute in the least to improving the performance in such cases, but was only wasteful with respect to the scale of the circuit.

The product sum/product difference arithmetic circuit also had the problem of a long processing time and too extensive a scale for the circuit. The product sum/product difference operation is a process frequently performed in DSPs. Therefore, a portion of or the entire product sum/product difference arithmetic circuit is installed as a special purpose circuit in many cases. However, the processing time and the scale of the circuit do not differ much from the product sum/product difference operation performed in the central arithmetic circuit in the aforementioned general DSP when the product sum/product difference arithmetic circuit 600, indicated in FIG. 9, is installed in the DSP as a product sum/product difference special purpose circuit, and the need for performing the product sum/product difference operations at high speeds in a small scale circuit was never satisfied.

Furthermore, the absolute value distance arithmetic circuit also had the problem of not being able to effectively use the DSP arithmetic circuit for processing. Each process for subtraction, positive and negative adjustment, and accumulation was entirely processed in the arithmetic logic unit when the absolute value distance operation was processed in a general central arithmetic circuit, thus creating the problem of requiring three cycles and delaying the processing time. A problem of an increased circuit scale was also created when a special purpose circuit was installed and any of the aforementioned processes was performed in the special purpose circuit. There was also the problem of not being able to effectively use the arithmetic circuit because circuits, such as the adder, for example, that are installed in a general DSP, stop during the execution of said absolute value distance operation.

SUMMARY OF THE INVENTION

In summary, it was difficult to say that circuits, such as the aforementioned conventional central arithmetic circuit, product sum/product difference arithmetic circuit, and absolute value distance arithmetic circuit, that are widely used in DSPs, are sufficient with respect to the processing speed and the scale of the circuit.

Accordingly, the aim of this invention is to provide an arithmetic circuit with a reduced circuit delay, therefore, a fast processing speed, and also with a small circuit scale.

Specifically, the aim of this invention is to provide an arithmetic and logic operation circuit that effectively uses an arithmetic circuit with a long bit length and is ideally used in the central arithmetic circuit to improve performance.

The aim of this invention is also to provide a product sum/product difference arithmetic circuit with a reduced circuit delay and a small circuit scale.

Furthermore, the aim of this invention is to provide an absolute value distance arithmetic circuit in which special purpose circuits are reduced and absolute value distance operations can be performed at high speeds, while effectively using the structural circuits in a general DSP.

In attaining the aforementioned aim, the arithmetic and logic operation circuit, which is the arithmetic circuit in this invention, is equipped with a first arithmetic circuit that performs an arithmetic and logic operation of superordinate n bits; a second arithmetic circuit that performs an arithmetic and logic operation of subordinate m bits; a command control circuit that controls each of the arithmetic commands for the aforementioned first and second arithmetic circuits, based on arithmetic circuit dividing signals and arithmetic commands; and a carry transmission control circuit that controls the transmission of the carry between the aforementioned first and second arithmetic circuits, based on the aforementioned arithmetic circuit dividing signals.

The product sum/product difference arithmetic circuit in this invention is equipped with a multiplier that outputs a value as the result of the multiplication of the aforementioned two numerical values when the aforementioned addition and subtraction command is an addition command, and outputs a value as the aforementioned multiplication result multiplied by (−1) when the aforementioned addition and subtraction command is a subtraction command, based on the two numerical values that are consecutively added, and the addition and subtraction command; and an adder that consecutively adds and accumulates the aforementioned output values.

Ideally, the aforementioned multiplier adds partial products in order to obtain a multiplied result based on the Booth algorithm, and in which an output value, which is the result of the multiplication multiplied by (−1), is obtained by adding negative numerical values of the partial products at the stage in which the aforementioned partial products are added when the aforementioned addition and subtraction command is a subtraction command.

The absolute value distance arithmetic circuit in this invention is also equipped with a subtraction circuit that performs a subtraction of two numerical values that are consecutively input; and a product sum/product difference arithmetic circuit that seeks the absolute value distance, which is the absolute value resulting from the aforementioned subtraction accumulated consecutively and then added, based on the value of the result of the aforementioned subtraction and the sign of the result of the aforementioned subtraction.

Specifically, the aforementioned subtraction circuit and the aforementioned product sum/product difference arithmetic circuit are connected so that the value resulting from the aforementioned subtraction, and the value that has the sign resulting from the aforementioned subtraction with an absolute value of 1, are input into the multiplier at the aforementioned product sum/product difference arithmetic circuit as a multiplier and a multiplicand.

Specifically, the aforementioned subtraction circuit and the aforementioned product sum/product difference arithmetic circuit are connected so that the value resulting from the aforementioned subtraction and 1 are input into the multiplier at the aforementioned product sum/product difference arithmetic circuit as a multiplier and a multiplicand, and the sign resulting from the aforementioned subtraction, as an addition and subtraction command signal, is input into the adder-subtractor at the aforementioned product sum/product difference arithmetic circuit.

Ideally, the aforementioned product sum/product difference arithmetic circuit is a product sum/product difference arithmetic circuit in this invention.

A carry is transmitted between the aforementioned first and second arithmetic circuits in the arithmetic and logic operation circuit, which is an arithmetic circuit in this invention, when the arithmetic circuit dividing signal does not divide the arithmetic circuit, and a highly accurate arithmetic and logic operation of (n+m) bit can be processed by the identical arithmetic command. The aforementioned first and second arithmetic logic units stop the transmission of the carry when the aforementioned arithmetic circuit dividing signal divides the arithmetic circuit, and separate arithmetic and logic operations for each n bit and m bit can be processed in parallel, therefore, at a high speed.

The product sum/product difference arithmetic circuit, which is the arithmetic circuit in this invention, refers to an accumulative operation that follows, is an addition or subtraction at the stage in which the multiplication is performed, and outputs the result of the multiplication. In other words, the result of the multiplication outputs a general result of the multiplication when the accumulative operation is an addition, and it outputs a value in which the positive and negative is reversed by multiplying to the result of the multiplication by −1 when the accumulative operation is a subtraction. Accordingly, the processor can be constructed of an adder with simplified circuits because the accumulative operation always results in an addition. A product sum/product difference operation at a high speed can also be attained because the unnecessary process of forming complements several times at each stage of multiplication, addition, and subtraction can be eliminated.

Values, as a result of the subtraction of two numerical values and bit data of MSB indicating the positive and negative, are used in order to obtain the absolute value distance by multiplying data of the same sign or by subtracting the negative numerical values at the absolute value distance arithmetic circuit, which is an arithmetic circuit in this invention. Therefore, the absolute value distance operation can be performed using the multiplier and arithmetic and logic operation circuit that are generally installed in DSPs.

Figure 1:
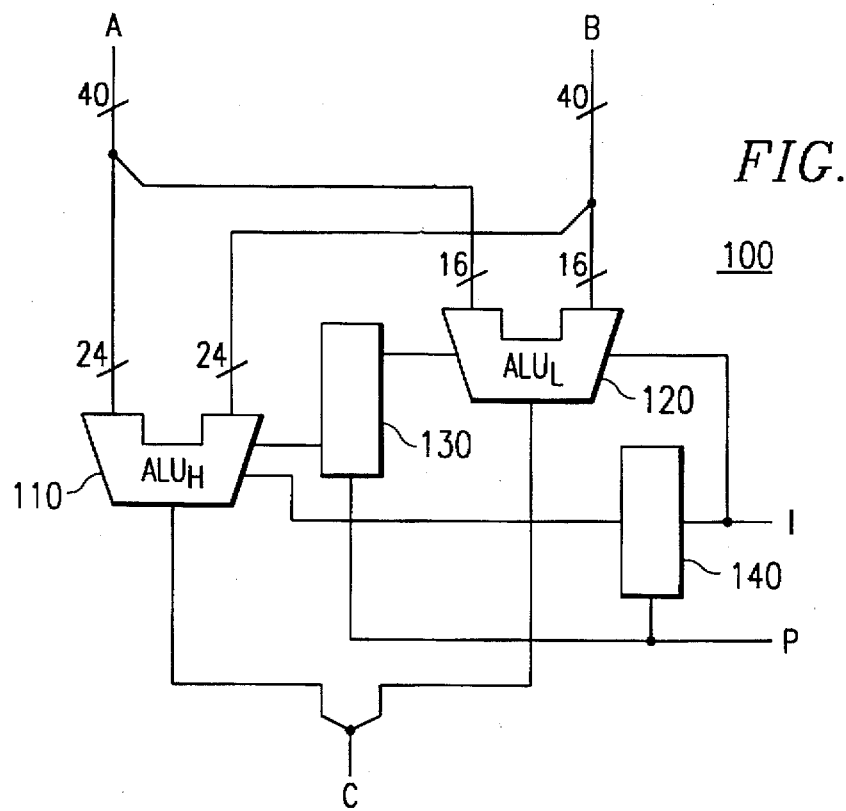
FIG. 1 is a diagram indicating the structure of the arithmetic and logic operation circuit in Application Example 1 in this invention.

REFERENCE NUMERALS 100 arithmetic logic unit 110 upper bit arithmetic logic unit, 120 lower bit arithmetic and logic processor, 130 carry transmission control unit, 140 command control unit, 200 product sum/product difference arithmetic circuit, 210 multiplier, 211–214 encoders, 251 E {X}OR gate, 220 adder, 221 half-adder, 222–223 full adders, 310,320 and 330 absolute value distance arithmetic circuits, 500 central arithmetic circuit, 520 arithmetic logic unit, 530 accumulator, 550 multiplexer, 600 product sum/product difference arithmetic circuit, 610 multiplier, 611–614 encoders, 615–618 partial products preparation units, 619 adder, 620 adder-subtractor, 621–623 EOR gates, 624–626 full adders, 630, 640 registers, 700 absolute value distance arithmetic circuit, 710 subtractor, 720 positive and negative adjusting circuit, 730 adder and 740–760 registers.

DETAILED DESCRIPTION OF THE FIGURES

APPLICATION EXAMPLES

APPLICATION EXAMPLE 1

An arithmetic circuit in this invention according to Application Example 1 will be explained with reference to FIG. 1.

FIG. 1 is a diagram indicating the structure of the arithmetic and logic operation circuit in Application Example 1. The arithmetic and logic operation circuit 100 is comprised of a first arithmetic logic unit 110, a second arithmetic logic unit 120, a carry transmission control unit 130, and a command control unit 140. Two pieces of input data A and B, arithmetic command I, and unit dividing signal p are input into the arithmetic and logic operation circuit 100, and data C, which is the result of the operation, is output. Each of the aforementioned pieces of input data A and B and output data C has a bit length of 40 bits. The aforementioned unit dividing signal p takes a value of 1 when the unit is divided for the operation and a value of 0 when it is not divided for the operation.

The operation of each of the aforementioned units will be explained first.

Each of the first arithmetic logic unit 110 and the second arithmetic and logic unit 120 has a specific bit length. Specific arithmetic operations are carried out on the input data, which is input from two input terminals for each, at the arithmetic circuits 110 and 120 according to the arithmetic command input from the command input terminals, and the results are output via the output terminals. The bit length of the input and output data, and data for the arithmetic operation the first arithmetic logic unit 110, is 24 bits in this application example, and the bit length of the input and output data, and data for the arithmetic operation in the second arithmetic logic unit 120, is 16 bits. The arithmetic operations performed in said first and second arithmetic circuits are the addition and subtraction operations and logic operations indicated in Table IV.

TABLE IV

| Commands | Operations |
| --- | --- |
| ADD | a + b → c |
| SUB | a − b → c |
| AND | a AND b → c |
| OR | a OR b → c |
| EOR | a EOR b → c |

In Table IV, a and b refer to input data and c refers to output data.

The first arithmetic logic unit 110 is equipped with a carry input terminal, and the second arithmetic logic unit 120 is equipped with a carry output terminal. Each is referred to or each is output during addition and subtraction operations performed in each of the arithmetic circuits.

The carry transmission control unit 130 controls the transmission of the carry from the second arithmetic logic unit 120 to the first arithmetic logic unit 110. The carry transmission control unit 130 connects the carry output from the second arithmetic logic unit 120 as the carry input into the first arithmetic logic unit 110 based on the unit dividing signal p when the aforementioned signal p does not divide the unit, which is a 0. It inputs 0, indicating that the carry is not present, as the carry input into the first arithmetic logic unit instead of the aforementioned connection when the aforementioned signal p divides the unit, which is a 1.

The carry transmission control unit 130 equipped with the aforementioned features can easily be constructed by a multiplexer that uses selective signals as the unit dividing signal p.

The command control unit 140 converts the arithmetic command I based on the unit dividing signal p, and inputs each of the arithmetic commands $i_1$ and $i_2$ into the first arithmetic logic unit 110 and the second arithmetic logic unit 120. The aforementioned conversion rule in this application example is indicated in Table V. As indicated in Table V, the command control unit 140 directly inputs the arithmetic command I into the first and second arithmetic logic units 110 and 120 when the unit dividing signal p is 0, which does not divide the unit. The individual arithmetic commands $i_1$ and $i_2$ are prepared from the arithmetic command I, which is input, and are input into each of the first and second arithmetic logic units 110 and 120 when the unit dividing signal p is 1, which divides the unit.

TABLE V

| I   | p | $i_1$ | $i_2$ |
|-----|---|-------|-------|
| ADD | 0 | ADD   | ADD   |
|     | 1 | SUB   | ADD   |
| SUB | 0 | SUB   | SUB   |
|     | 1 | ADD   | SUB   |
| AND | 0 | AND   | AND   |
|     | 1 | OR    | AND   |
| OR  | 0 | OR    | OR    |
|     | 1 | AND   | OR    |

In the arithmetic and logic operation circuit 100 equipped with each of the structural units described above, each of the pieces of input data A and B having a bit length of 40 bits is first divided into the upper 24 bits and lower 16 bits, respectively, and each is input into the first and second arithmetic logic units 110 and 120, respectively. Accordingly, an arithmetic operation for the target upper 24 bits of each of the pieces of input data A and B is processed in the first arithmetic logic unit 110, and an arithmetic operation for the target lower 16 bits of each of the pieces of input data A and B is processed in the second arithmetic logic unit 120.

Accordingly an identical arithmetic command is input and an identical operation is carried out in the first and second arithmetic logic units 110 and 120 when the unit dividing signal p is 0. The carry is also transmitted from the second arithmetic logic unit 120 to the first arithmetic logic unit 110. Accordingly, the aforementioned first and second arithmetic logic units 110 and 120 in this case function as one 40 bit arithmetic logic unit.

Different arithmetic commands are input into the first and second arithmetic logic units 110 and 120 when the unit dividing signal p is 1, the carry is not transmitted between each of the aforementioned arithmetic circuits, and each of the aforementioned arithmetic circuits has a totally different operation. Accordingly, there is a state in which two arithmetic circuits of 24 bits and 16 bits, respectively, are processed in parallel.

As described above, the arithmetic and logic operation circuit 100 in this invention operates as an arithmetic circuit of 40 bits when a bit length of 40 bits is necessary, but can operate as arithmetic circuits of 24 bits and 16 bits in parallel when small values are the targets. Accordingly, a general purpose arithmetic and logic operation circuit with high performance can be attained.

Data to the aforementioned first and second arithmetic logic units 110 and 120 was divided at 24 bits and 16 bits in this application example; however, it can be properly divided at any optional bit length without being limited to said [bit lengths].

Each performs a different arithmetic operation when the aforementioned first and second arithmetic logic units 110 and 120 are divided and used in this invention, although it is also possible to perform the same arithmetic operation.

An arithmetic circuit in this invention according to Application Example 2 will be explained with reference to FIGS. 2–4.

Figure 2:
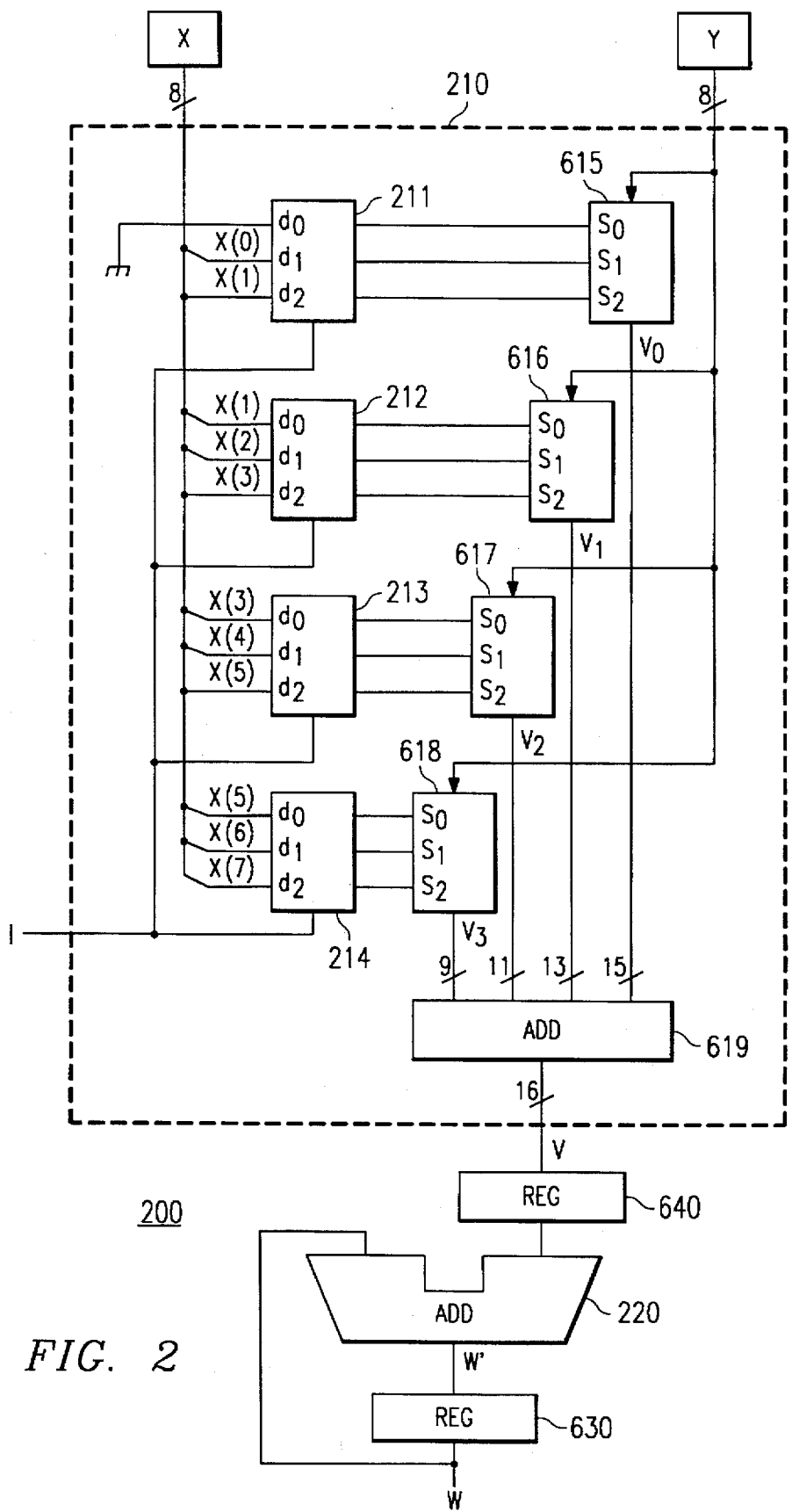
FIG. 2 is a diagram indicating the structure of the product sum/product difference arithmetic circuit in Application Example 2 in this invention.

FIG. 2 is a diagram indicating the structure of a product sum/product difference arithmetic circuit in Application Example 2. A product sum/product difference arithmetic circuit 200 is comprised of a multiplier 210, adder 220, register 630, and register 640. This product sum/product difference arithmetic circuit 200 is one in which the results of the multiplication operations of multiplier X and multiplicand Y, which are consecutively input, are consecutively added and subtracted according to the addition and subtraction command I, and the accumulation result W is obtained. As an example, the aforementioned multiplier X and multiplicand Y are data of 8 bits and the accumulation result W is data of 16 bits in this invention.

Figure 3:
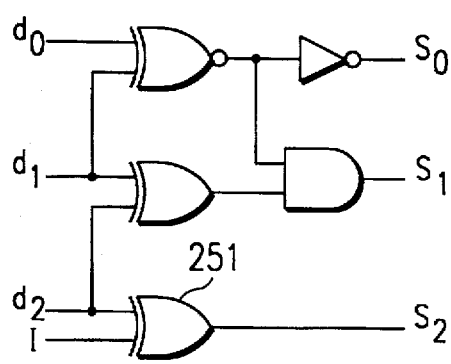
FIG. 3 is a diagram of a logic circuit of an encoder that is used in an adder in the product sum/product difference arithmetic circuit indicated in FIG. 2.

FIG. 3 is a diagram of a logic circuit for an encoder 211 that is used by the multiplier 210 in the product sum/product difference arithmetic circuit 200.

Figure 4:
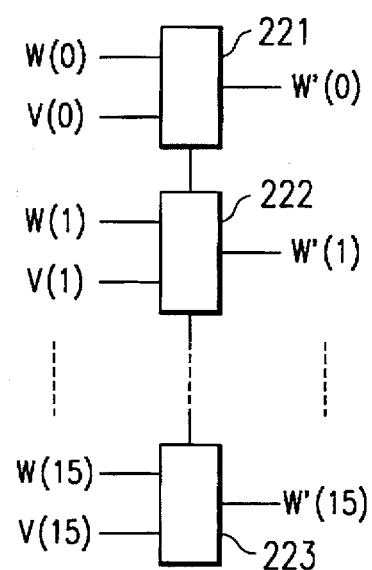
FIG. 4 is a diagram indicating the structure of the adder in the product sum/product difference arithmetic circuit indicated in FIG. 2.

FIG. 4 is a diagram indicating the structure of the adder 220 in the product sum/product difference arithmetic circuit 200.

The structure of the multiplier 210 will be explained first. The multiplier 210 in this invention is based on the Booth algorithm, and it is further constructed to output the numerical value, which is the result of the multiplication of multiplier X and multiplicand Y multiplied by (−1), as a result of the multiplication when the addition and subtraction command I for the accumulation is a subtraction command [command].

More precisely, the multiplier is multiplied twice and divided into sections with three bits in each from the lower bits, a partial product for each of the sections of three bits is obtained by the multiplicand Y, and the multiplication result is obtained by adding the partial products. This method of obtaining partial products follows the rules indicated below.

When the addition and subtraction command I is an addition command, 0 when the aforementioned multiplied partial value of 3 bits is 0, multiplicand Y when the aforementioned multiplied partial value of 3 bits is 1, multiplicand Y when the aforementioned multiplied partial value of 3 bits is 2, numerical value obtained by multiplying multiplicand Y by 2 when the aforementioned multiplied partial value of 3 bits is numerical value obtained by multiplying the complement of multiplicand Y by 2 when the aforementioned multiplied partial value of 3 bits is 4, complement of multiplicand Y when the aforementioned multiplied partial value of 3 bits is 5, complement of multiplicand Y when the aforementioned multiplied partial value of 3 bits is 6, 0 when the aforementioned multiplied partial value of 3 bits is 7.

Also, when the addition and subtraction command I is a subtraction command, 0 when the aforementioned multiplied partial value of 3 bits is 0, complement of multiplicand Y when the aforementioned multiplied partial value of 3 bits is 1, complement of multiplicand Y when the aforementioned multiplied partial value of 3 bits is 2, numerical value obtained by multiplying the complement of multiplicand Y by 2 when the aforementioned multiplied partial value of 3 bits is 3, numerical value obtained by multiplying multiplicand Y by 2 when the aforementioned multiplied partial value of 3 bits is 4, multiplicand Y when the aforementioned multiplied partial value of 3 bits is 5, multiplicand Y when the aforementioned multiplied partial value of 3 bits is 6, 0 when the aforementioned multiplied partial value of 3 bits is 7.

The algorithm described above is attained in a circuit structure that will be explained below with the multiplier 210. The multiplier 210 is comprised of encoders 211–214, partial product preparation units 615–618, and an adder 619.

Multiplier X is first divided into four sections with three bits in each by overlapping one bit, as in (0, X(0), X(1)), (X(1), X(2), X(3)), (X(3), X(4), X(5)), and (X(5), X(6), X(7)) in the multiplier 210. Each of the aforementioned multiplied sections with three bits in each is input into the encoders 211–214, respectively.

Partial product selection signals $S_{2-0}$ are prepared in the encoders 211–214 based on the aforementioned data of the divided multiplier X and three bits input and the addition and subtraction command I. The preparation rule and a diagram of a logic circuit of the encoder 211 are indicated in Table VI and FIG. 3, respectively. The remaining encoders 212–214 are also identical to the encoder 211. The selection signals $S_{2-0}$ that are prepared are input into the partial product preparation units 615–618.

TABLE VI

| I | $d_2$ | $d_1$ | $d_0$ | $s_2$ | $s_1$ | $s_0$ |
|---|---|---|---|---|---|---|
| 0 | 0 | 0 | 0 | 0 | 0 | 0 |
| 0 | 0 | 0 | 1 | 0 | 0 | 1 |
| 0 | 0 | 1 | 0 | 0 | 0 | 1 |
| 0 | 0 | 1 | 1 | 01 | 1 | 0 |
| 0 | 1 | 0 | 0 | 1 | 1 | 0 |
| 0 | 1 | 0 | 1 | 1 | 0 | 1 |
| 0 | 1 | 1 | 0 | 1 | 0 | 1 |
| 0 | 1 | 1 | 1 | 1 | 0 | 0 |
| 1 | 0 | 0 | 0 | 1 | 0 | 0 |
| 1 | 0 | 0 | 1 | 1 | 0 | 1 |
| 1 | 0 | 1 | 0 | 1 | 0 | 1 |
| 1 | 0 | 1 | 1 | 0 | 1 | 0 |
| 1 | 1 | 0 | 0 | 0 | 1 | 0 |
| 1 | 1 | 0 | 1 | 0 | 0 | 1 |
| 1 | 1 | 1 | 0 | 0 | 0 | 1 |
| 1 | 1 | 1 | 1 | 0 | 0 | 0 |

The partial product preparation units 615–618 have the same features as the partial product preparation unit that is used by the multiplier 610 in the aforementioned conventional product sum/product difference arithmetic circuit 600. More precisely, partial product $V_{3-0}$ is output based on the selection signal $S_{2-0}$ that is input according to Table III.

The adder 619 also has the same features as the adder used by the multiplier 610 in the aforementioned conventional product sum/product difference arithmetic circuit 600. More precisely, partial products $V_{3-0}$ that are input from each of the partial product preparation units 615–618 are added while considering the lag in the bits, and multiplication result V is obtained.

As described above, the multiplication result V calculated in the multiplier 210 is stored in the register 640.

The accumulated result W that has been stored up to that point in the register 630, and the multiplication result V that is stored in the register 640, are added in the adder 220, and the addition result W' is again stored in the register 630. The structure of said adder 220 is indicated in FIG. 4.

As a result of the aforementioned accumulation, the contents of the register 630 are reset by resetting signals, not shown in the figure, at the beginning of a consecutive product sum/product difference arithmetic operation.

Figure 11:
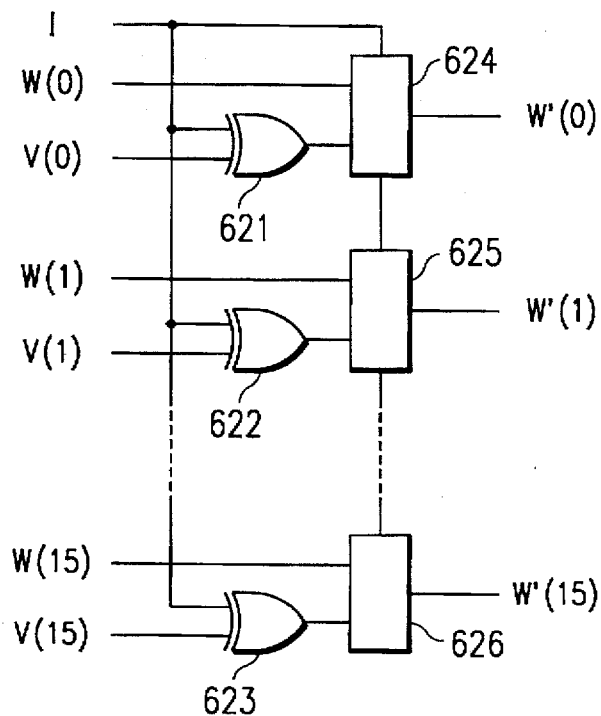

As explained above, the multiplier in the product sum/product difference arithmetic circuit in this invention outputs the value while considering the addition and subtraction command at accumulation, which is the multiplication result V when performing a sum of products operation, or the number (−V), the result of the multiplication multiplied by (−1), when performing a difference of products operation. Controlling signs resulting from the multiplication operation can be attained only through a circuit change in which an exclusive-OR element 251 is added to a bus that does not increase the circuit delay in the encoder 211 of the multiplier as indicated in FIG. 3. Also through this, the adder-subtractor indicated in FIG. 11 only becomes sufficient with an addition circuit as indicated in FIG. 4, therefore, exclusive-OR elements 621–623 for subtraction operations become unnecessary, the circuit becomes simplified, and the circuit delay is reduced. Accordingly, the scale of the circuit becomes small and the processing time can be shortened.

APPLICATION EXAMPLE 3

An arithmetic circuit in this invention according to Application Example 3 will be explained with reference to FIG. 5.

Figure 5:
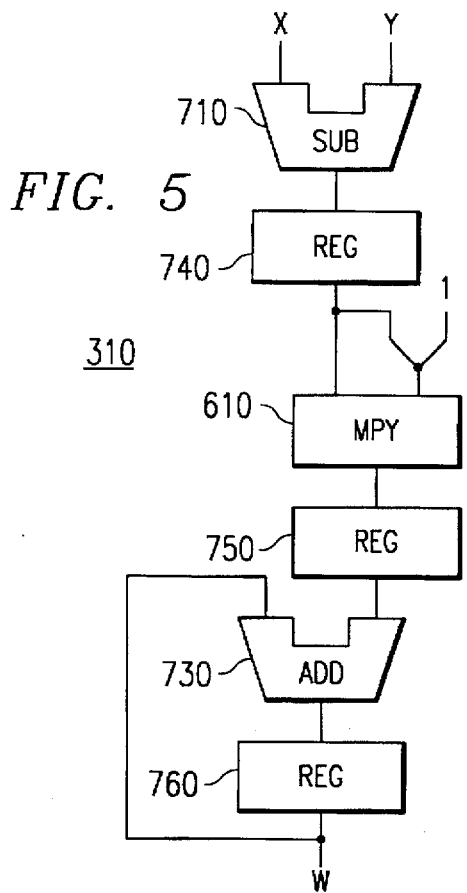
FIG. 5 is a diagram indicating the structure of the absolute value distance arithmetic circuit in Application Example 3 in this invention.

FIG. 5 is a diagram indicating the structure of the absolute value distance arithmetic circuit in Application Example 3. An absolute value distance arithmetic circuit 310 is comprised of a subtractor 710, multiplier 610, adder 730, and registers 740, 750 and 760.

Figure 8:
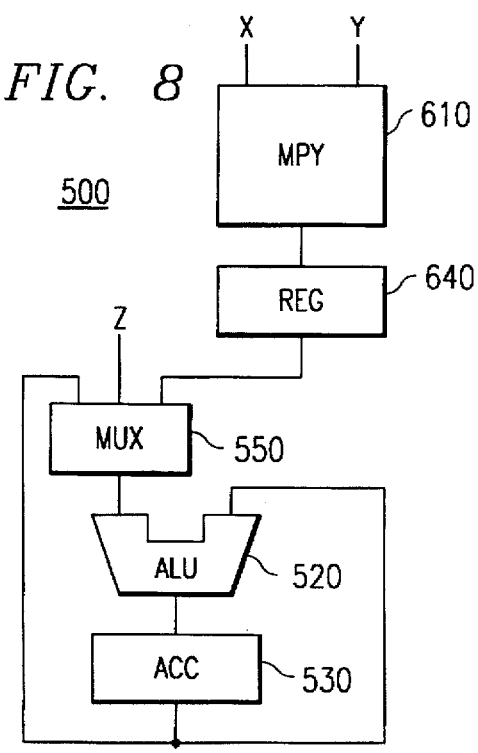
FIG. 8 is a diagram indicating the structure of the major part in the central arithmetic circuit of DSP.
Figure 9:
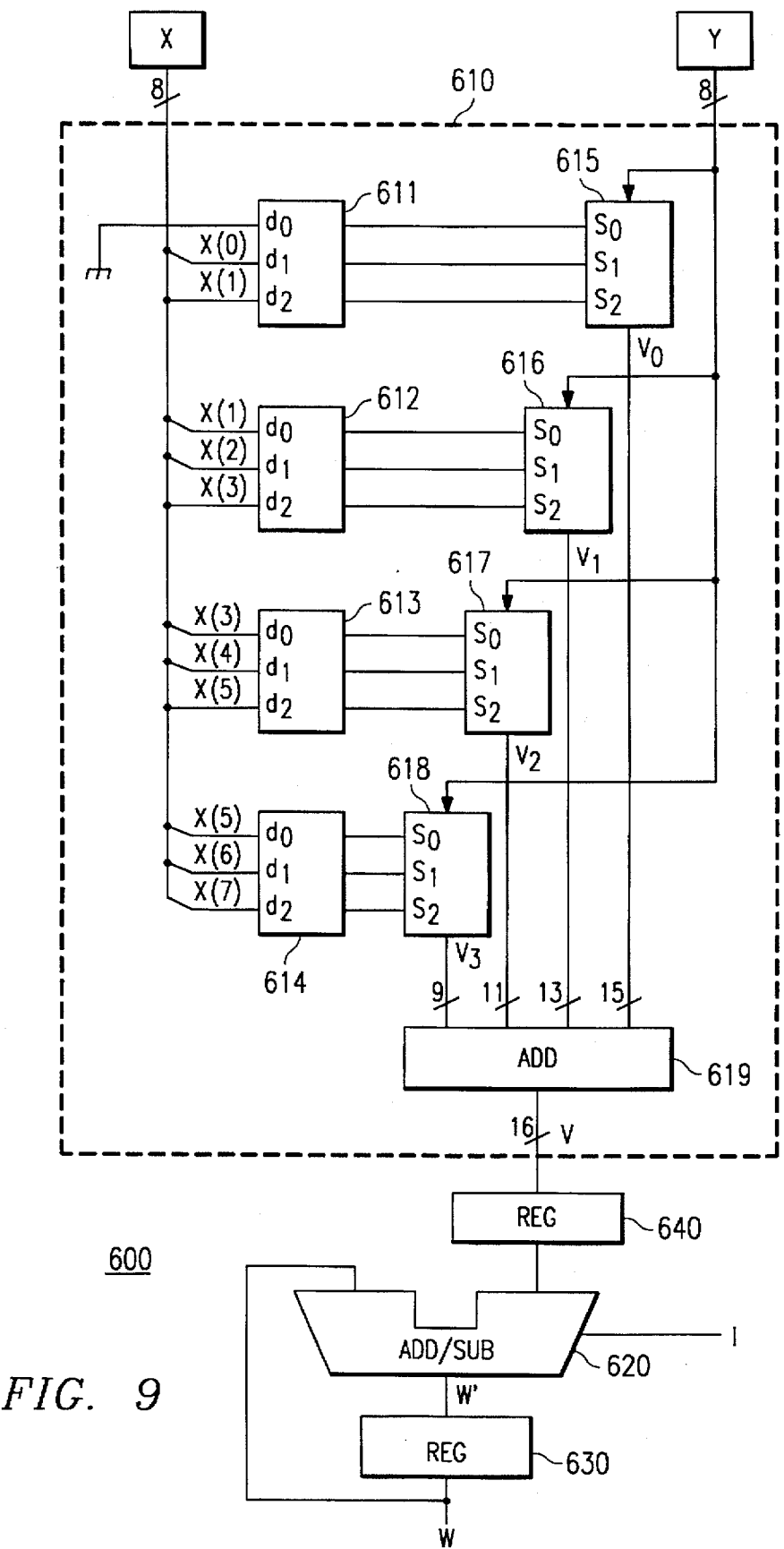
FIG. 9 is a diagram indicating the structure of the conventional product sum/product difference arithmetic circuit.
Figure 10:
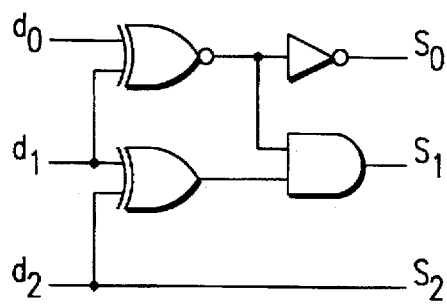
FIG. 10 is a diagram of a logic circuit of an encoder that is used in an adder in the product sum/product difference arithmetic circuit indicated in FIG. 9.
Figure 12:
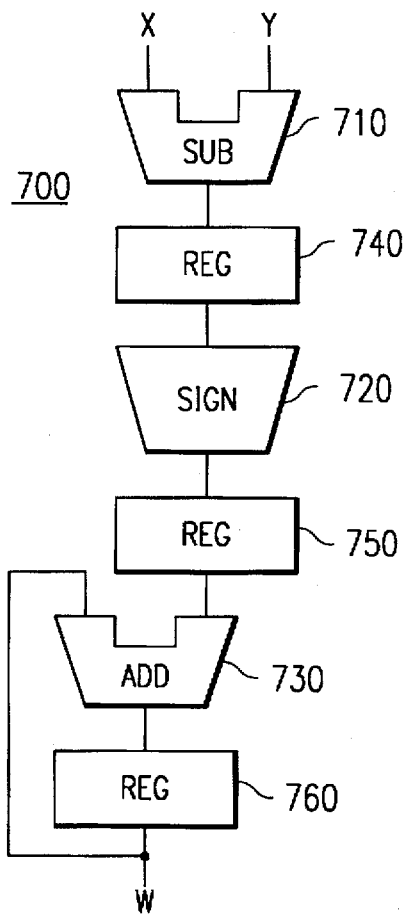
FIG. 12 is a diagram indicating the structure of the conventional absolute value distance arithmetic circuit.

The subtractor 710, adder 730, and registers 740, 750 and 760 have the same structures and operations as each of the units having the same reference numerals as in the aforementioned conventional absolute value distance arithmetic circuit 700. The absolute value distance arithmetic circuit 310 in Application Example 3 has a structure in which the positive and negative adjusting circuit 720 in the conventional absolute value distance arithmetic circuit 700 is substituted by the multiplier 610. Said multiplier 610 may be a multiplier commonly equipped in the DSP indicated in FIG. 8, and a connection is made so that the value of the result of the subtraction that is stored in the register 740 and the value in which MSB of data indicating the numerical value 1 is substituted by MSB as the result of the aforementioned subtraction, can each be input into the multiplier 610 as a multiplier and a multiplicand.

The value, as the result of the subtraction stored in the register 740, if a positive number, is multiplied by 1 in the multiplier 610, and if a negative number, multiplied by (−1) in the multiplier 610 at the absolute value distance arithmetic circuit 310 with said structure. Accordingly, an absolute value resulting from the subtraction operation can be obtained as an output from the multiplier 610, either way.

In this way, absolute values can be obtained using a multiplier that is generally installed in the DSP at the absolute value distance arithmetic circuit 310 in Application Example 3. Accordingly, it is not necessary to additionally add a separate absolute value distance arithmetic circuit, and the scale of the circuit can be reduced. When compared to a case in which all of the subtracting, positive and negative adjusting, and accumulating is performed in the arithmetic and logic operation circuit, the positive and negative adjusting of absolute values can be performed in the multiplier, therefore, parallel processing can be realized and absolute value distance operations can be performed at high speeds.

APPLICATION EXAMPLE 4

An arithmetic circuit in this invention according to Application Example 4 will be explained with reference to FIG. 6.

Figure 6:
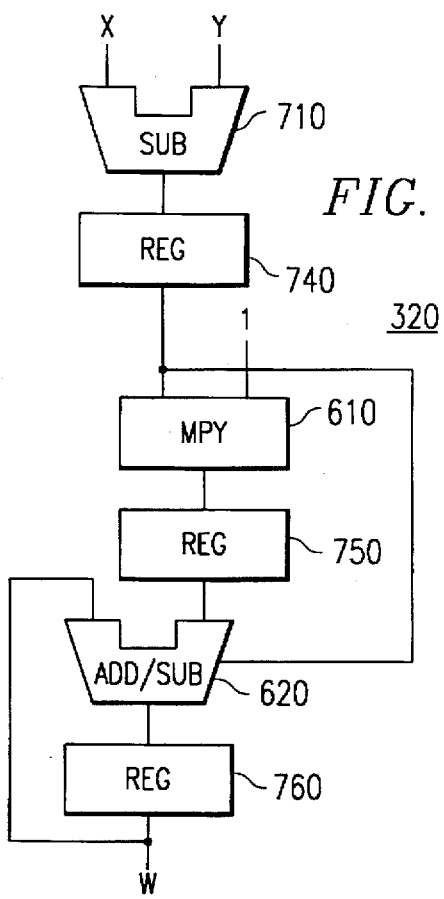
FIG. 6 is a diagram indicating the structure of the absolute value distance arithmetic circuit in Application Example 4 in this invention.

FIG. 6 is a diagram indicating the structure of the absolute value distance arithmetic circuit in Application Example 4. The absolute value distance arithmetic circuit 320 is comprised of a subtractor 710, multiplier 610, adder-subtractor 620, and registers 740–760. Each of the aforementioned structural units has the same structure and operation as each of the units with the same reference numerals as in the aforementioned conventional absolute value distance arithmetic circuit 700, product sum/product difference arithmetic circuit 600, and central arithmetic circuit 500 in a common DSP.

The adder 730 in the absolute value distance arithmetic circuit 310 in Application Example 3 is substituted by the adder-subtractor 620 in the absolute value distance arithmetic circuit 320 in Application Example 4, and addition and subtraction in the adder-subtractor 620 are controlled by the MSB of the value as the result of the subtraction in the subtractor 710. A connection is also made so that the value of the result of the subtraction operation stored in the register 740 and data indicating the numerical value 1 can each be input into the multiplier 610 as a multiplier and a multiplicand.

The value resulting from the subtraction operation stored in the register 740, is multiplied by 1 only, therefore, the value of the result of the aforementioned subtraction operation is output from the multiplier 610 without a change in the absolute value distance arithmetic circuit 320 with the structure described above. Addition or subtraction is switched by the value, resulting from the aforementioned subtraction operation, in the adder-subtractor 620; therefore, addition is performed when the result of the subtraction operation is positive and subtraction is performed when negative. Subtraction operation of negative numerical values results in an addition operation of absolute numerical values, therefore, their absolute values are accumulated even though the value resulting from the aforementioned subtraction operation is either positive or negative.

In this way, absolute value distances can be obtained using an arithmetic circuit comprised of a multiplier and a, adder-subtractor that are generally installed in the DSP in the absolute value distance arithmetic circuit 320 in Application Example 4. Accordingly, the scale of the circuit can be reduced as in the aforementioned Application Example 3 and absolute value distances can be obtained at high speeds.

Also, when compared to the absolute value distance arithmetic circuit in the aforementioned Application Example 3, the numerical value 1 may be input as a multiplicand in the multiplier 610 without the need for setting the MSB of the value resulting from the aforementioned subtraction operation to MSB, therefore, the point in which data input into the multiplier 610 is easily prepared is effective.

APPLICATION EXAMPLE 5

An arithmetic circuit in this invention according to Application Example 5 will be explained with reference to FIG. 7.

Figure 7:
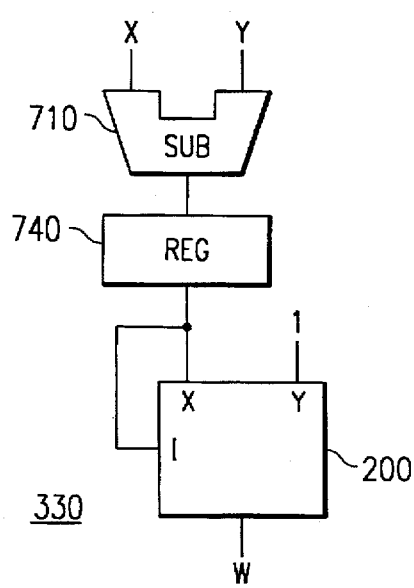
FIG. 7 is a diagram indicating the structure of the absolute value distance arithmetic circuit in Application Example 5 in this invention.

FIG. 7 is a diagram indicating the structure of the absolute value distance arithmetic circuit in Application Example 5. The absolute value distance arithmetic circuit 330 is comprised of a subtractor 710, a product sum/product difference arithmetic circuit 200, and a register 740. Each of the structures and the operations of the subtractor 710 and register 740, and the product sum/product difference arithmetic circuit 200 is identical to each of the units with the same reference numerals in the aforementioned conventional absolute value distance arithmetic circuit 700 and the sum of products/difference of products arithmetic circuit 200 indicated in Application Example 2.

A connection is made so that the value resulting from the subtraction operation stored in the register 740 as a multiplier, numerical value 1 as a multiplicand, the MSB of a value resulting from the aforementioned subtraction operation as an addition and subtraction command are each input into the product sum/product difference arithmetic circuit 200 in the absolute value distance arithmetic circuit 330 in Application Example 5. MSB becomes 0 when the value resulting from the aforementioned subtraction operation is positive, and MSB becomes 1 when it is negative. The product sum/product difference arithmetic circuit 200 performs an addition operation when the addition and subtraction command is 0 and performs a subtraction operation when it is 1.

The value resulting from the subtraction operation, is multiplied by 1, addition is performed when the result of the subtraction is positive, and subtraction is performed when it is negative in the product sum/product difference arithmetic circuit 200, as in Application Example 4, at the absolute value distance arithmetic circuit 330 with the structure described above. The subtraction process of negative numerical values results in an addition operation of absolute values, therefore, their absolute values are accumulated whether the value resulting from the aforementioned subtraction operation is positive or negative.

In this way, absolute value distances can be obtained using the product sum/product difference arithmetic circuit in this invention indicated in Application Example 2 in the absolute value distance arithmetic circuit 330 in Application Example 5. Accordingly, absolute value distance operations can be performed at high speeds in a smaller scale circuit.

Registers are inserted between each of the units in the structure in the aforementioned application examples. A structure in which the registers are eliminated by adding the features of the registers to each of the units can be used as needed. Also, a structure in which the registers themselves are eliminated can be used if possible.

Arithmetic processing of data with short bit lengths can be attained at high speeds using the arithmetic and logic operation circuit as the arithmetic circuit in this invention. Accordingly, an arithmetic circuit that corresponds to data with long bits can be effectively used, and an arithmetic and logic operation circuit with high performance and a central arithmetic processing circuit that uses this can be provided.

Product sum/product difference operations can be performed without unnecessary positive and negative conversions in the product sum/product difference arithmetic circuit in this invention. The accumulation process can be realized at a high speed because only the adder is required as the accumulation processor, and the circuit scale of the accumulation circuit is reduced. Accordingly, a product sum/product difference arithmetic circuit at high speeds with a small circuit scale is provided.

A circuit that allows for high speed absolute value distance operations using a multiplier or an arithmetic and logic arithmetic circuit, which are installed in common DSPs, was attained in the absolute value distance arithmetic circuit, which is the arithmetic circuit in this invention. Accordingly, the number of special purpose circuits were reduced, and conventional circuits were effectively used. Accordingly, an absolute value distance arithmetic circuit that allows for high-speed calculations of the absolute value distances in which the circuit scale was reduced is provided.

We claim:

1. A product sum/product difference arithmetic circuit comprising:

first and second input terminals for respectively receiving multiplier x data and multiplicand y data as numerical values;

a multiplier including a plurality of multiplier sections, each of said multiplier sections having the same number of plural data bits arranged in cascade so as to overlap one data bit in successive multiplier sections, a plurality of encoders having plural inputs and outputs and respectively corresponding to the plurality of multiplier sections for receiving the data bits from respective multiplier sections in the plural inputs thereof and producing encoded data bits at the plural outputs thereof, each of said plurality of encoders further having an additional input, a plurality of partial product preparation units having plural inputs and an output and respectively corresponding to the plurality of encoders for receiving the encoded data bits produced at the plural outputs of said encoders at the plural inputs thereof, each of said plurality of partial product preparation units further having an additional input, said first input terminal being connected to said plurality of multiplier sections for providing the x data thereto, said second input terminal being connected to said additional input of each of said plurality of partial product preparation units for providing the y data thereto, an add/subtract control terminal connected to the said additional input of each of said encoders for providing either an add command signal or a subtract command signal to the respective encoder, and an adder connected to said plurality of partial product preparation units and having plural inputs and an output for receiving the outputs from said plurality of partial product preparation units at the plural inputs thereof and providing a multiplication result at the output thereof;

whereby said multiplier generates and outputs a value as a result of the multiplication of two input x and y numerical values when an add command signal from said add/subtract control terminal is input to said additional input of each of said encoders, and generates and outputs a value as a result of the multiplication of two input x and y numerical values multiplied by (−1) when a subtract command signal from said add/subtract control terminal is input to said additional input of each of said encoders.

2. A product sum/product difference arithmetic circuit as set forth in claim 1, wherein said multiplier is based upon a Booth algorithm, and each of said multiplier sections included in said multiplier has three data bits, with one data bit overlapping in successive multiplier sections.

3. An absolute value distance arithmetic circuit comprising:

first and second input terminals for respectively receiving multiplier x data and multiplicand y data as numerical values;

a subtraction circuit having first and second inputs and an output for receiving numerical values x and y as consecutively input from said first and second input terminals and performing a subtraction operation with respect thereto to produce a subtraction result at the output thereof; and a product sum/product difference arithmetic circuit connected to the output of said subtraction circuit, said product sum/product difference arithmetic circuit comprising:

a multiplier including a plurality of multiplier sections, each of said multiplier sections having the same number of plural data bits arranged in cascade so to overlap one data bit in successive multiplier sections, a plurality of encoders having plural inputs and outputs and respectively corresponding to the plurality of multiplier sections for receiving the data bits from respective multiplier sections in the plural inputs thereof and producing encoded data bits at the plural outputs thereof, a plurality of partial product preparation units having plural inputs and an output and respectively corresponding to the plurality of encoders for receiving the encoded data bits produced at the plural outputs of said encoders at the plural inputs thereof, each of said plurality of partial product preparation units further having an additional input, said multiplier having first and second inputs for respectively receiving the output of said subtraction circuit and the value of the same sign as a result of the subtraction operation with an absolute numerical value of 1 as a multiplier, and an adder connected to said plurality of partial product preparation units and having plural inputs and an output for receiving the outputs from said plurality of partial product preparation units at the plural inputs thereof and providing a multiplication result at the output thereof as the output of said multiplier.

4. An absolute value distance arithmetic circuit as set forth in claim 3, further including first and second shift registers having respective inputs and outputs, the input of said first shift register being connected to the output of said multiplier;

an arithmetic unit having first and second inputs and an output, the first input of said arithmetic unit being connected to the output of said first shift register and the output of said arithmetic unit being connected to the input of said second shift register; and a feed-back line connected between the output of said second shift register and the second input of said arithmetic unit.

5. An absolute value distance arithmetic circuit as set forth in claim 4, wherein said arithmetic unit is an adder.

6. An absolute value distance arithmetic circuit as set forth in claim 4, wherein said arithmetic unit is an adder/subtractor, said adder/subtractor having a third input connected to the output of said subtraction circuit and performing as an adder when the subtraction result at the output of said subtraction circuit is positive and as a subtractor when the subtraction result at the output of said subtraction circuit is negative.

* * * * *